United States Patent
Draper (10) Patent No.: US 9,074,530 B2
(45) Date of Patent: Jul. 7, 2015

(54) STOICHIOMETRIC EXHAUST GAS RECIRCULATION AND RELATED COMBUSTION CONTROL

(75) Inventor: Samuel David Draper, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 378 days.

(21) Appl. No.: 12/973,976

(22) Filed: Jan. 13, 2011

(65) Prior Publication Data

US 2012/0185144 A1    Jul. 19, 2012

(51) Int. Cl.
*G06F 19/00*    (2011.01)
*F02C 9/18*     (2006.01)
*F02C 3/34*     (2006.01)
(Continued)

(52) U.S. Cl.
CPC ... *F02C 9/18* (2013.01); *F02C 3/34* (2013.01); *B01D 53/9445* (2013.01); *B01D 53/9495* (2013.01); *F01N 9/00* (2013.01); *F01N 3/0814* (2013.01); *B01D 53/9459* (2013.01); *B01D 53/9422* (2013.01); *F01K 13/02* (2013.01); *F01K 23/10* (2013.01); *F02C 7/228* (2013.01); *F02C 7/232* (2013.01);
(Continued)

(58) Field of Classification Search
CPC .......... F01K 23/101; F02C 1/007; F02C 3/34; F02C 6/18; F02C 9/16; F02C 9/20; F02C 7/10; F02C 3/305; F02C 9/50; F01N 3/023; F01N 3/0842; F01N 3/0864; F01N 3/0814; F01N 9/00; F02D 41/0052; F02D 41/0055; B01D 53/9422; B01D 53/9445; B01D 53/9459; B01D 53/9495

USPC .................................. 701/100, 109; 60/299
See application file for complete search history.

(56) References Cited

U.S. PATENT DOCUMENTS 2,906,092 A   9/1959   Haltenberger
3,703,807 A   11/1972  Rice
(Continued)

FOREIGN PATENT DOCUMENTS

CN   101586498   11/2009
CN   103069130   4/2013
(Continued)

OTHER PUBLICATIONS

Chinese Office Action, "Review Notice for First Examination" issued in related Application No. CN-201210070670.1 with English translation dated Jan. 6, 2015, 28 pages.

*Primary Examiner* — Thomas G Black
*Assistant Examiner* — Sze-Hon Kong
(74) *Attorney, Agent, or Firm* — Nixon & Vanderhye, P.C.

(57) ABSTRACT

A fuel control system for a gas turbine engine that includes a primary fuel circuit, a fuel tuning circuit, a plurality of combustors connected to the fuel tuning circuit, oxygen and carbon dioxide sensors in the exhaust stream and a feedback control loop operatively connected to the fuel tuning circuit and to the oxygen and carbon monoxide sensors which serve to control the precise amount of fuel and air being fed to each one of the plurality of combustors in the engine. A parallel array of control valves in a tuning fuel circuit connect to corresponding ones of the plurality of combustors in the gas turbine engine. The fuel control system thereby "fine tunes" the amount of fuel and air being fed to each combustor using data regarding the detected oxygen and carbon monoxide concentrations in the exhaust gas as provided through a feedback control loop.

20 Claims, 6 Drawing Sheets

(51) Int. Cl.
*B01D 53/94* (2006.01)
*F01N 9/00* (2006.01)
*F01N 3/08* (2006.01)
*F01K 13/02* (2006.01)
*F01K 23/10* (2006.01)
*F02C 7/228* (2006.01)
*F02C 7/232* (2006.01)

(52) U.S. Cl.
CPC ...... *F05D 2260/61* (2013.01); *F05D 2270/082* (2013.01); *Y02T 50/677* (2013.01)

(56) References Cited

U.S. PATENT DOCUMENTS

| | | | |
|---|---|---|---|
| 3,785,145 A | 1/1974 | Amann | |
| 4,133,171 A | 1/1979 | Earnest et al. | |
| 4,204,401 A | 5/1980 | Earnest | |
| 4,313,300 A | 2/1982 | Wilkes et al. | |
| 4,529,887 A | 7/1985 | Johnson | |
| 4,731,990 A | 3/1988 | Munk | |
| 4,928,478 A | 5/1990 | Maslak | |
| 4,984,426 A * | 1/1991 | Santi | 60/281 |
| 5,628,182 A * | 5/1997 | Mowill | 60/804 |
| 5,794,431 A * | 8/1998 | Utamura et al. | 60/783 |
| 5,867,977 A | 2/1999 | Zachary et al. | |
| 5,896,741 A * | 4/1999 | Etheridge | 60/39.23 |
| 5,930,990 A | 8/1999 | Zachary et al. | |
| 6,139,604 A * | 10/2000 | Gottzmann et al. | 95/54 |
| 6,173,562 B1 * | 1/2001 | Utamura et al. | 60/773 |
| 6,202,400 B1 * | 3/2001 | Utamura et al. | 60/773 |
| 6,244,034 B1 * | 6/2001 | Taylor et al. | 60/776 |
| 6,247,315 B1 * | 6/2001 | Marin et al. | 60/672 |
| 6,301,888 B1 * | 10/2001 | Gray, Jr. | 60/605.2 |
| 6,470,682 B2 * | 10/2002 | Gray, Jr. | 60/605.2 |
| 6,508,209 B1 * | 1/2003 | Collier, Jr. | 123/3 |
| 6,532,745 B1 * | 3/2003 | Neary | 60/784 |
| 6,598,398 B2 * | 7/2003 | Viteri et al. | 60/716 |
| 6,598,402 B2 * | 7/2003 | Kataoka et al. | 60/775 |
| 7,007,487 B2 * | 3/2006 | Belokon et al. | 60/777 |
| 7,043,920 B2 * | 5/2006 | Viteri et al. | 60/716 |
| 7,184,875 B2 * | 2/2007 | Ferrall et al. | 701/101 |
| 7,185,497 B2 * | 3/2007 | Dudebout et al. | 60/776 |
| 7,523,603 B2 * | 4/2009 | Hagen et al. | 60/39.55 |
| 7,536,252 B1 * | 5/2009 | Hibshman et al. | 701/108 |
| 7,553,568 B2 * | 6/2009 | Keefer | 429/411 |
| 7,620,461 B2 * | 11/2009 | Frederick et al. | 700/30 |
| 7,770,396 B2 * | 8/2010 | Roby et al. | 60/737 |
| 7,921,633 B2 * | 4/2011 | Rising | 60/39.52 |
| 7,934,924 B2 * | 5/2011 | Joklik et al. | 431/4 |
| 7,950,233 B2 * | 5/2011 | Alkabie et al. | 60/752 |
| 7,966,829 B2 * | 6/2011 | Finkenrath et al. | 60/772 |
| 8,051,638 B2 * | 11/2011 | Aljabari et al. | 60/39.52 |
| 8,117,825 B2 * | 2/2012 | Griffin et al. | 60/39.52 |
| 8,417,433 B2 * | 4/2013 | Gauthier et al. | 701/100 |
| 8,437,941 B2 * | 5/2013 | Chandler | 701/100 |
| 8,483,931 B2 * | 7/2013 | Williams et al. | 701/100 |
| 8,538,657 B2 * | 9/2013 | Snider | 701/100 |
| 8,616,004 B2 * | 12/2013 | Zupanc et al. | 60/754 |
| 8,731,797 B2 * | 5/2014 | Demougeot et al. | 701/100 |
| 2002/0103407 A1 * | 8/2002 | Hatanaka | 585/733 |
| 2003/0074883 A1 * | 4/2003 | Cirrito et al. | 60/39.34 |
| 2003/0144787 A1 * | 7/2003 | Davis et al. | 701/100 |
| 2004/0103668 A1 * | 6/2004 | Bibler et al. | 60/776 |
| 2004/0182373 A1 * | 9/2004 | Li et al. | 123/568.12 |
| 2004/0206090 A1 * | 10/2004 | Yee et al. | 60/777 |
| 2004/0261401 A1 * | 12/2004 | Ohkl et al. | 60/285 |
| 2005/0107941 A1 * | 5/2005 | Healy | 701/100 |
| 2005/0235649 A1 | 10/2005 | Baer et al. | |
| 2006/0179824 A1 * | 8/2006 | Roser | 60/289 |
| 2006/0213490 A1 * | 9/2006 | Vigild et al. | 123/704 |
| 2006/0254279 A1 * | 11/2006 | Taware et al. | 60/772 |
| 2007/0089425 A1 * | 4/2007 | Motter et al. | 60/775 |
| 2008/0022680 A1 * | 1/2008 | Gingrich et al. | 60/605.2 |
| 2008/0134669 A1 * | 6/2008 | Lange | 60/295 |
| 2008/0243352 A1 * | 10/2008 | Healy | 701/100 |
| 2009/0005952 A1 * | 1/2009 | Tonno et al. | 701/100 |
| 2009/0173078 A1 * | 7/2009 | Thatcher et al. | 60/773 |
| 2009/0218821 A1 * | 9/2009 | Elkady et al. | 290/52 |
| 2009/0229238 A1 * | 9/2009 | Zhang et al. | 60/39.24 |
| 2009/0301096 A1 * | 12/2009 | Remy et al. | 60/773 |
| 2009/0308054 A1 * | 12/2009 | Satoh et al. | 60/285 |
| 2010/0050653 A1 * | 3/2010 | Lam | 60/772 |
| 2010/0061907 A1 * | 3/2010 | Sun et al. | 423/239.1 |
| 2010/0115924 A1 * | 5/2010 | Gabe et al. | 60/285 |
| 2010/0115960 A1 * | 5/2010 | Brautsch et al. | 60/772 |
| 2010/0183491 A1 * | 7/2010 | Mazumdar et al. | 423/224 |
| 2010/0251697 A1 * | 10/2010 | Nakatani et al. | 60/277 |
| 2010/0275581 A1 * | 11/2010 | Wada et al. | 60/276 |
| 2010/0290963 A1 * | 11/2010 | Andersen et al. | 423/213.2 |
| 2010/0326084 A1 * | 12/2010 | Anderson et al. | 60/775 |
| 2011/0072802 A1 * | 3/2011 | Bidner et al. | 60/287 |
| 2011/0106403 A1 * | 5/2011 | Stein et al. | 701/102 |
| 2011/0172893 A1 * | 7/2011 | Nomura et al. | 701/100 |
| 2011/0256052 A1 * | 10/2011 | Merritt | 423/658 |
| 2012/0029795 A1 * | 2/2012 | Surnilla et al. | 701/111 |
| 2013/0125555 A1 * | 5/2013 | Mittricker et al. | 60/772 |

FOREIGN PATENT DOCUMENTS

JP 7269373 10/1995
WO WO 2010115434 A1 * 10/2010 ............ G01N 27/414

* cited by examiner

STOICHIOMETRIC EXHAUST GAS RECIRCULATION AND RELATED COMBUSTION CONTROL

The present invention relates to gas turbine engine systems and related controls and, more particularly, to a gas turbine engine having a plurality of combustors, each of which can be separately controlled using a feedback control loop to adjust the fuel-to-air ratio based on detected amounts of oxygen and carbon monoxide in the exhaust, while ensuring that unwanted $NO_x$ emissions can be removed from the exhaust using a catalyst. The invention provides what is referred to herein as "stoichiometric exhaust gas recirculation ("SEGR").

BACKGROUND OF THE INVENTION

Gas turbine engines typically include a compressor section, a combustor section and at least one turbine that rotates in order to generate electrical power. The compressor discharge feeds directly into the combustor section where hydrocarbon fuel is injected, mixed and burned. The combustion gases are then channeled into and through one or more stages of the turbine which extracts rotational energy from the combustion gases. In order to achieve maximum operating efficiency, gas turbine combustion systems operate over a wide range of different fuel compositions, pressures, temperatures and fuel/air ratio conditions, preferably with the ability to use either liquid or gas fuels or a combination of both (known as "dual fire" systems). However, many candidate hydrocarbon fuels for use in gas turbine combustors contain unwanted contaminants and/or byproducts of other processes that tend to inhibit combustion and/or reduce the capacity and efficiency of the system.

In recent years, the abatement of emissions, particularly $NO_x$, has also gained increased attention in the U.S. due to strict emission limits and environmental pollution control regulations imposed by the federal government. In the burning of a hydrocarbon fuel, the oxides of nitrogen result from high temperature oxidation of the nitrogen in air, as well as from the oxidation of nitrogen compounds, such as pyridine, in the hydrocarbon-based fuels.

Some progress has been made in reducing $NO_x$ emissions in gas turbine engines using exhaust gas recirculation due to the "vitiation effect," which causes the combustor inlet oxygen concentration to be reduced and the $CO_2$ concentration and moisture content to increase compared to a non-recirculation system. Because the rate of formation of $NO_x$ is strongly dependent on peak flame temperature, a small decrease in flame temperature tends to lower the $NO_x$ emissions. One known technique involves recirculating the exhaust gas to the gas turbine engine which results in additional $CO_2$ being formed, but with only incremental decreases in the $O_2$ and CO concentration. Unfortunately, the amount of oxygen remaining in the exhaust gas using exhaust gas recirculation invariably remains at or above about 2% and it is well known that excess amounts of oxygen can adversely effect the efficiency of most $NO_x$ removal catalysts. Thus, previous efforts to reduce and/or eliminate $NO_x$ in the exhaust stream using recirculation have met with only limited success.

Another concern in applying exhaust gas recirculation to a stationary gas turbine engine involves the need to reduce the exhaust gas temperature and avoid increasing the combustor inlet temperatures or compressor load when the inlet stream is combined with the recirculation. Commonly owned U.S. Pat. No. 4,313,300 teaches that the problem of excess heat can be substantially overcome if the power plant includes a combined gas turbine steam turbine system with the recycled gases being introduced into the single air compressor supplying air to the gas turbine combustor. However, the '300 patent does not teach or suggest using data regarding the carbon monoxide present in the exhaust gas to adjust the amount of fuel being fed to the combustors, operating either alone or in tandem with other combustors.

Heretofore, monitoring carbon monoxide emissions to control the fuel to air ratios of individual selected combustors in a gas turbine engine has not been used, particularly through the use of feedback control or tuning circuits such as those described herein. Nor do known prior art gas turbine systems provide an acceptable method for fine-tuning the fuel-to-air ratio on an individual combustor-by-combustor basis in order to reduce the amount of CO and oxygen present in the exhaust. Examples of known prior art gas turbine systems include U.S. Pat. No. 6,598,402 to Kataoka et al which discloses an exhaust gas recirculation-type gas turbine that recycles a portion of the exhaust gas to the intake of a compressor and a recirculation control unit for adjusting the amount of gas being returned to correspond to the change in load of the gas turbine. The '402 patent does not rely on the amount of carbon monoxide detected in the exhaust stream as a means for adjusting the fuel to air feed to selected combustion units. Nor does the patent teach how to provide for stoichiometric exhaust gas recirculation control.

U.S. Pat. Nos. 6,202,400 and 5,794,431 to Utamura et al describe two different, but related, methods for improving the thermal efficiency of a gas turbine and steam turbine combination whereby a portion of the gas turbine exhaust is recirculated to the compressor in order to help maintain a more uniform and constant compressor feed temperature and improve the overall thermal efficiency of the system. Neither patent teaches using a tuning fuel circuit or feedback control to effectively reduce the CO or oxygen content of the exhaust based on the detected amount carbon monoxide in the exhaust stream. In addition, the mere detection of CO does not address the need for stoichiometric exhaust gas recirculation control.

PCT application Serial No. WO 99/30079 describes a heat recovery steam generator for use with the exhaust of a gas turbine engine that includes an air pollution control assembly comprising a selective catalytic reduction catalyst for reducing the amount of exhaust gas emissions, including $NO_x$ and CO. Again, the '079 application does not teach or suggest using the detected amount of CO in the exhaust as a means for controlling selected fuel inputs to the combustors or teach how to provide for stoichiometric exhaust gas recirculation.

BRIEF DESCRIPTION OF THE INVENTION

The present invention provides a new fuel control circuit for a gas turbine engine that includes a primary fuel circuit, a fuel tuning circuit, a plurality of combustors connected to the fuel tuning circuit, oxygen and carbon dioxide sensors in the gas turbine exhaust stream and a feedback control loop operatively connected to the fuel tuning circuit. The oxygen and carbon monoxide sensors serve to control the amount of fuel fed to each one of the plurality of combustors using control valves to thereby define a tuning fuel circuit with each valve corresponding to a single combustor ("can") in a multi-combustor gas turbine engine. Exemplary systems according to the invention include a catalyst for removing any residual oxygen and carbon monoxide from the exhaust stream. The fuel control system "fine tunes" the amount of fuel being fed to each combustor using data regarding the detected oxygen and carbon monoxide concentrations in the exhaust gas as provided through a feedback control loop.

The present invention also encompasses a method for analyzing and controlling the composition of an exhaust gas from a gas turbine engine using the new feedback controls described herein, as well a gas turbine engine comprising a plurality of combustors, corresponding feedback control loop and tuning fuel circuit.

DETAILED DESCRIPTION OF THE INVENTION

The stoichiometric exhaust gas recirculation (SEGR) gas turbine engine according to the present invention is intended to provide a zero oxygen content exhaust that can be more effectively treated with a $NO_x$ reduction catalyst to provide an exhaust stream free of $NO_x$ contaminants. When applied to enhanced oil recovery applications, the invention is ideal for carbon capture and storage processes, and useful in any process where a diluent is required with no oxygen.

As noted above, in a conventional SEGR gas turbine system, the products of the combustion invariably contain excess oxygen due to the equilibrium chemistry at nominal temperatures of combustion, with some of the $CO_2$ products of combustion disassociating into CO and $O_2$. In addition, perfect mixing of fuel and air cannot be achieved, resulting in some of the oxygen present in the feed not reacting with hydrocarbon fuel. Thus, the resulting exhaust stream, comprised predominantly of $N_2$ and $CO_2$, will still contain small amounts of CO and $O_2$. Typically, the products of combustion pass through the turbine section of the gas turbine engine and enter a heat recovery steam generator (HRSG) that includes an oxidation catalyst which, at the lower temperatures in the HRSG, changes the equilibrium between CO and $O_2$ and $CO_2$, forcing the trace amounts of CO and $O_2$ to convert to $CO_2$ and creating an exhaust stream with lower oxygen content.

In order for the CO catalyst to approach zero oxygen content, sufficient CO must be present to consume all the $O_2$ in the exhaust. The practicality of gas turbine operation requires that a certain amount of excess fuel be used in the combustion system to ensure the presence of an excess amount of CO. Too much CO in the exhaust, however, can have a negative effect on overall gas turbine operation because the energy content of the excess CO will not be captured by the gas turbine, resulting in an efficiency penalty to the system. For those reasons, it is important to minimize and carefully control the amount of excess CO in the exhaust stream.

Two known practicalities in the combustion process also drive the need to control the amount of excess CO in the exhaust. First, the fuel to air ratio of the total gas turbine is subject to control limits. That is, only a finite ability exists to control the amount of fuel being fed to the gas turbine. Second, a gas turbine combustion system often consists of multiple combustion cans, each of which operates with a slightly different fuel to air ratio, resulting in variations in the emissions on a can-to-can basis. These two effects result in a need to operate the gas turbine with excess fuel to create the right amount of excess CO to ensure that all the oxygen is consumed in the exhaust. Achieving that goal is described herein by reference to a design target value and illustrated by way of example in FIG. 6.

Figure 6:
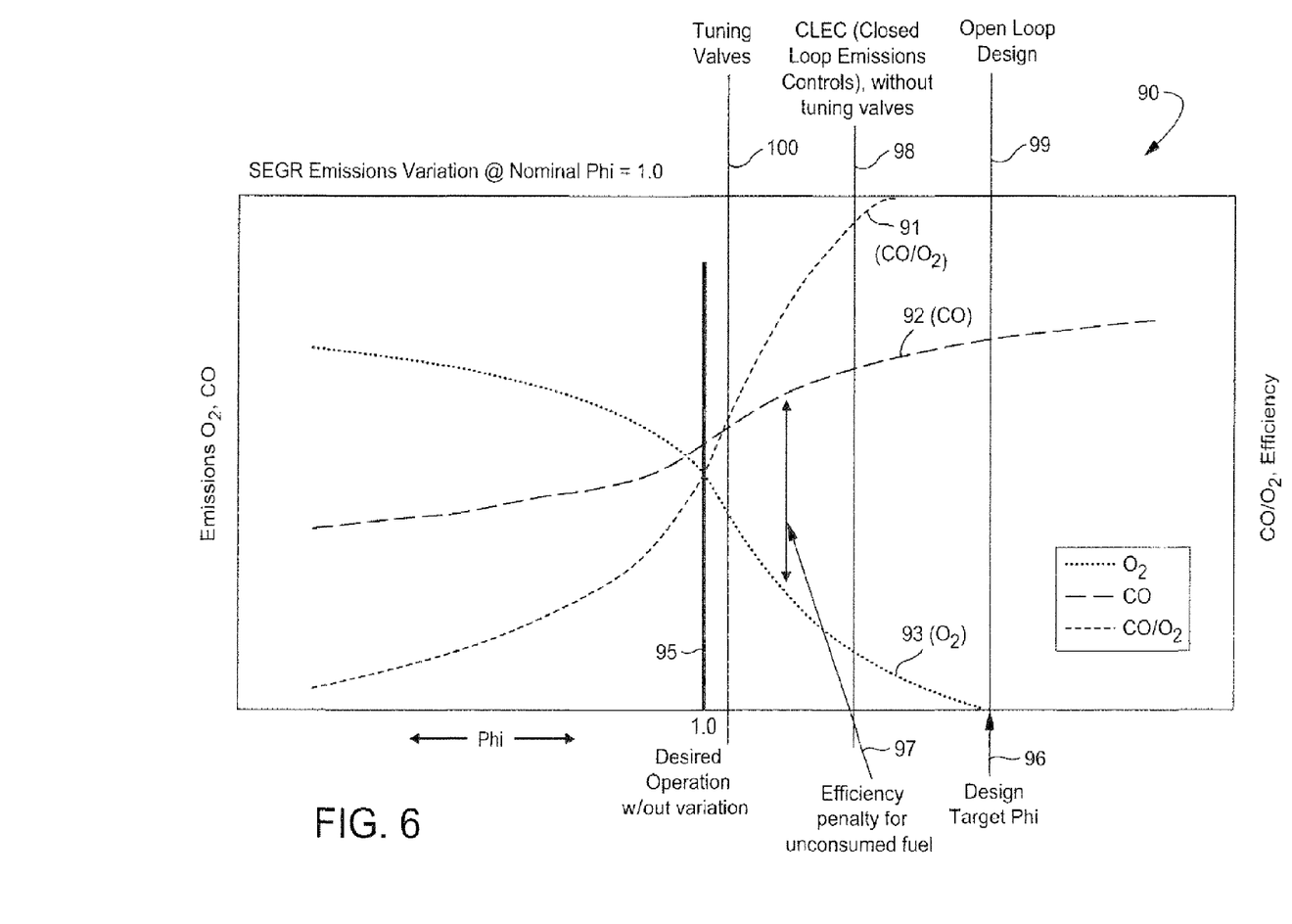
FIG. 6 is a graphical representation of stoichiometric exhaust gas recirculation emissions under different operating conditions to illustrate the potential benefits of using a tuning fuel circuit and feedback control system according to the invention.

According to the present invention, by using closed loop emissions controls and monitoring the emissions from the gas turbine in the exhaust, the overall fuel to air ratio of the gas turbine combustor can be much more precisely controlled, reducing the excess CO requirement, again as shown in FIG. 6. The can-to-can variation of the fuel to air ratio is still not eliminated by this approach. However, by adding tuning fuel circuits to each combustion can, the fuel to air ratio in each can be controlled to a level of precision not previously utilized or even contemplated in gas turbine operation. The fuel can be tuned to each can, and feedback can be measured in the exhaust as the total CO concentration in the exhaust due to the precisely controlled nature of CO production approaching near stoichiometric operation. See FIG. 3 discussed in greater detail below.

The improved gas turbine engine design using SEGR the results in a final exhaust gas stream discharged from the combustors effectively free of unused oxygen and uniquely positioned for treatment using a three-way or comparable catalyst to reduce the carbon monoxide and $NO_x$ emissions in the stream down to acceptable levels, preferably near zero. As noted above, the difficulty in achieving low $NO_x$ and carbon monoxide emissions has become increasingly complex in recent times due to the fact that most gas turbine engine systems employ multiple combustors, often with different fuel/air rates and corresponding different exhaust compositions feeding into a single carbon monoxide measurement and treatment system. Although a single feedback control loop for the exhaust can be used to adjust the main fuel/air mixture upstream of the combustors, depending on the amount of carbon monoxide detected in the final exhaust, such systems cannot achieve the highest potential use of the oxygen remaining in the exhaust (or recycle). As a result, it has been difficult, if not almost impossible, to achieve an effectively zero $NO_x$ and CO emissions from such systems because of the vagaries of monitoring and controlling the different and fluctuating fuel/air ratios in different combustor cans.

The present invention thus provides an improved combustor operation through highly accurate monitoring and control of the individual fuel/air feeds to selected ones of the combustors. The resulting improved engine performance can be maintained for long periods of time based on the sensed carbon monoxide and oxygen present in the exhaust stream. In addition, the exponential relationship of the CO being produced by different combustors can be leveraged to correspond directly to individual combustor fuel/air ratios, with the net result being a substantial decrease in the amount of $NO_x$ in the combustion exhaust as compared to prior art gas turbine designs. The new design also facilitates $CO_2$ capture during downstream processing of the turbine exhaust due to the inherent decrease in $NO_x$ and CO constituents.

In exemplary embodiments, individual combustors (cans) are each operatively connected to a tuning fuel circuit along with flow control means capable of raising or lowering the fuel/air ratio in very small increments, with the net objective of bringing the main fuel/air circuit as close to a stoichiometric ideal as possible, i.e., with all oxygen present in the recycle being consumed during combustion, resulting in significantly reduced overall $NO_x$ and CO production.

During startup operations, CO exhaust measurements are taken with all of the cans operating in a lean condition and low carbon monoxide production. One by one, the tuning fuel circuit controlling the individual operation of all cans in the system sends a command to each can to increase the fuel feed. The monitored CO content in the exhaust stream will begin to increase almost immediately. The resulting detected CO amount causes a control signal to be sent via a closed feedback control loop to fuel circuits connected in parallel. The rate of fuel being fed to each can is then modified, depending on the detected CO amount. As the tuning fuel circuit is being implemented and the fuel incrementally adjusted for each successive can, the corresponding carbon monoxide level increases quickly, resulting in a signal from the control loop to discontinue adding fuel to that particular can. The process is repeated as each can in succession is monitored and adjusted until the optimum desired fuel/air ratio is achieved for the entire system. The same tuning/feedback control operation can be used periodically if needed during normal engine operations to ensure optimum SEGR performance over long periods of continuous operation.

Further, much lower levels of CO and oxygen can be achieved in the turbine exhaust as compared to conventional combustor control systems using the SEGR technique. Because each combustor can be "fine tuned" successively and independently to achieve a near stoichiometric operation, the system offers considerable advantages over conventional multiple combustor control designs requiring a "rich" operation to guarantee the presence of excess CO. As noted above, if the combustor was designed in accordance with standard practice, the dynamics of the individual combustors can vary from one to another as a result of different fuel to air ratios and changing fuel splits. Although the difference in fuel to air ratio may have little effect on the overall performance of the gas turbine, the amount of oxygen in the exhaust will necessarily also vary from can to can, leading to unacceptable results when the oxygen levels remain high. The higher oxygen levels cause a reduced level of effectiveness of the catalyst, often rendering the catalyst only 50% effective as compared to 99% effectiveness at oxygen levels close to zero. Thus, the invention ensures that the $NO_x$ catalyst will maintain a high level of effectiveness by keeping the oxygen levels in the final exhaust close to a theoretical zero.

Figure 1:
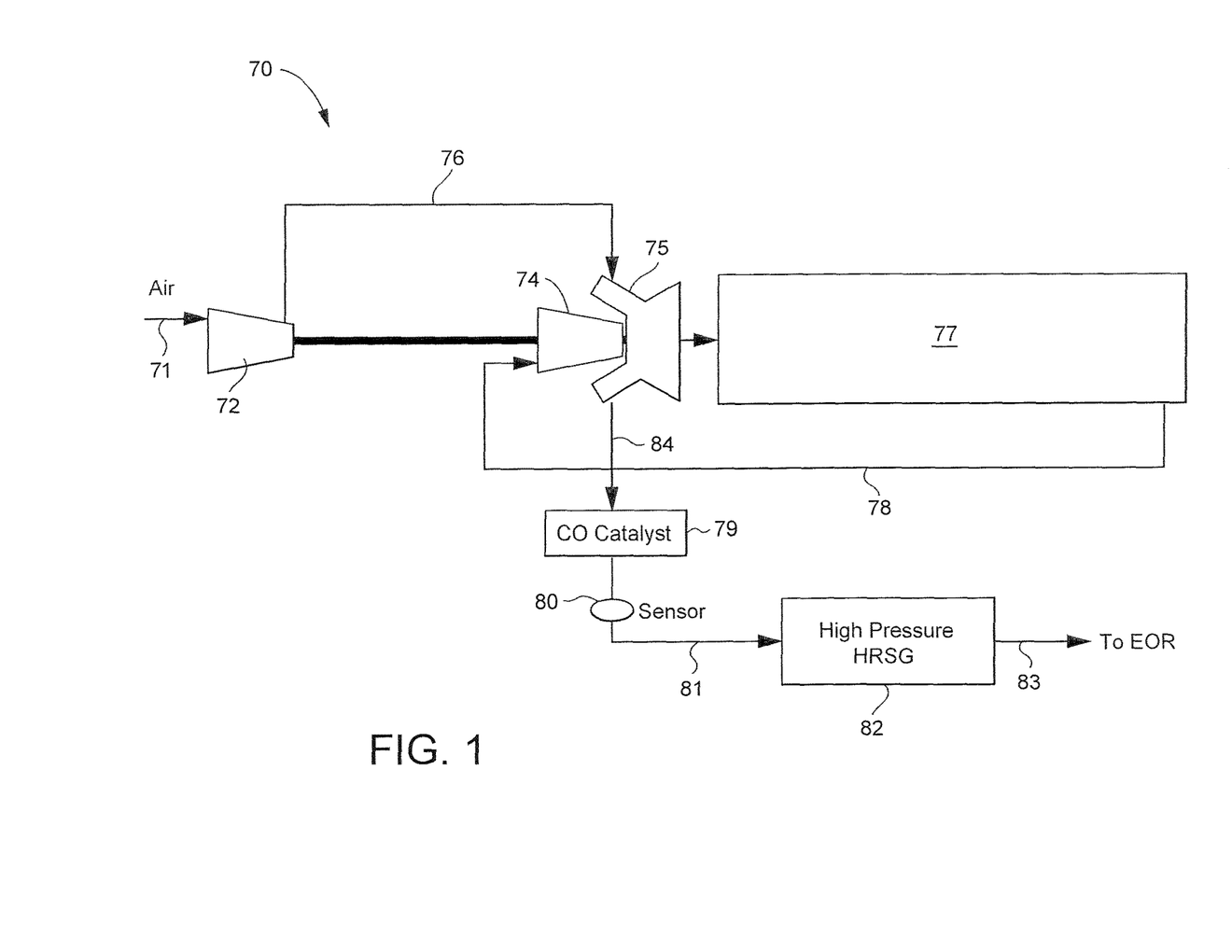
FIG. 1 depicts the process flow diagram of an exemplary embodiment of the invention having a gas turbine engine and fuel control system for monitoring the gas turbine exhaust and controlling the fuel-to-air ratios of individual combustor cans using a feedback control loop to achieve maximum thermal efficiency and CO removal.

Turning to the figures, FIG. 1 depicts an exemplary process flow diagram for a system (shown generally as 70) that utilizes a SEGR gas turbine engine and heat recovery steam generator ("HRSG") with the potential to benefit from the feedback control system of the present invention. FIG. 1 depicts a known system capable of being modified as described above to monitor the gas turbine exhaust and control the fuel-to-air ratios of individual combustor cans using feedback control loops to achieve maximum thermal efficiency and CC removal. FIG. 1 also illustrates the potential performance penalties that inevitably will be encountered when a combustor is not capable of consuming all of the oxygen and carbon monoxide during the combustion step. Invariably, a carbon monoxide catalyst must be employed in order to form carbon dioxide and consume the remaining oxygen present in the exhaust (which has the side benefit of creating heat for a high pressure heat recovery stream generator).

As FIG. 1 indicates, air 71 is fed into a main air compressor ("MAC") 72 and passes at elevated pressure directly into the gas turbine combustor through air piping 76. The exhaust from the gas turbine combustor passes through a lower pressure heat recovery steam generator 77 and the recirculation loop 78 is recycled back as feed to gas turbine compressor 74. The system ensures that all flows within the gas turbine, including turbine cooling and leakage air, contain no oxygen.

FIG. 1 also illustrates the inherent performance penalty associated with conventional systems in that the gas turbine exhaust must be treated to remove as much residual CO and oxygen as possible. That is, the combustion operation is less than perfect, requiring the residual unburned oxygen and CO to be treated separately. Here, the gas turbine exhaust at 84 passes through a CO catalyst bed 79 which removes CO and consumes unburned oxygen present in the exhaust. The resulting CO and oxygen combine to form carbon dioxide in an exothermic reaction. The high pressure HRSG uses the heat to generate additional steam by extracting the energy via the steam turbine. In theory, the amount of residual carbon monoxide in the system will be reduced as low as possible without sacrificing overall efficiency. Following treatment by the catalyst, the treated exhaust stream passes through a CO sensor and into high pressure heat recovery steam generator 82 which utilizes the additional heat generated by the catalyst treatment. The high pressure oxygen free exhaust (indicated at line 83) then undergoes a final treatment prior to release into the environment.

Figure 2:
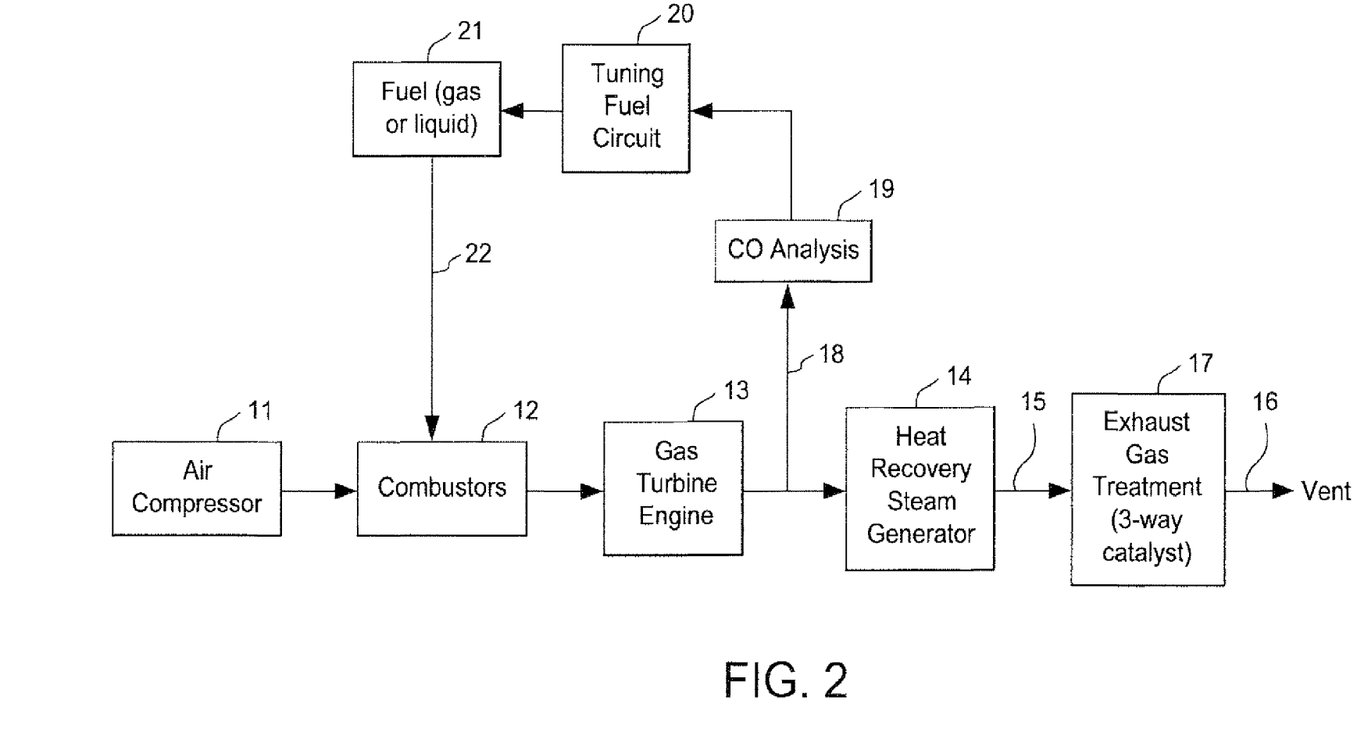
FIG. 2 is a block flow diagram depicting the major process steps for achieving stoichiometric exhaust gas recirculation ("SEGR") and combustion control according to the invention to thereby reduce the performance penalties inherent in conventional gas turbine engine designs.

FIG. 2 is a block flow diagram depicting the major process steps for achieving stoichiometric exhaust gas recirculation and combustion control using feedback control according to the invention. An exemplary system includes an air compressor 11 which feeds compressed air into a plurality of fuel combustors 12, which in turn feed expanded high temperature exhaust gases into gas turbine 13. During operation, air compressor 11 feeds compressed air to the back of combustors 12 while a main fuel source (gas or liquid hydrocarbons) 21 provides the primary fuel stream to the combustors. The air and fuel are mixed and burned, with the hot gases of combustion flowing directly from the combustors 12 into the gas turbine 13 where energy is extracted from the combustion gases to produce work.

In accordance with a first embodiment of the invention, the exhaust gases leaving gas turbine 13 are analyzed to determine the amount of carbon dioxide present in the exhaust at CO analysis station 19, with the results of the analysis fed to a tuning fuel circuit as part of a feedback loop in order to periodically monitor and adjust the amount of air and fuel (gas or liquid) being fed to the system as shown at 21. The amount of fuel and air fed to each combustor may change depending on the detected amount of oxygen and carbon monoxide in the exhaust stream, with the objective being to fine tune the fuel-to-air ratio being fed to each combustor while reducing the $NO_x$ concentration in the exhaust stream. The adjusted fuel flow to the combustor is shown generally at 22. Each of the individual combustors can be monitored and adjusted using the feedback loop based on data being continuously collected and evaluated. That is, each combustor can is periodically checked and adjusted over time on an individual basis until it reaches an optimum, steady state condition as described in more detail below.

FIG. 2 also depicts the use of a conventional heat recovery steam generator ("HRSG") 14 in combination with the gas turbine 13 in order to increase the thermal efficiency of the entire system. The resulting exhaust stream 15 with reduced heat value is typically treated in an exhaust gas treatment stage 17 using, for example, a three-way catalyst to remove residual $NO_x$ compounds and other environmentally unwanted contaminants and combustion byproducts before being released into the atmosphere through vent 16.

Figure 3:
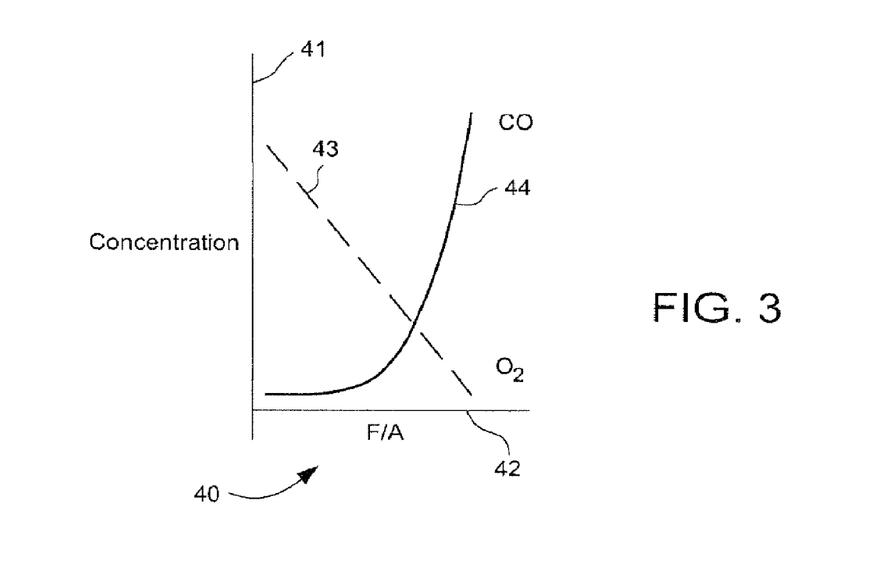
FIG. 3 is a graphical representation comparing the relative amounts of oxygen and carbon monoxide present in an exemplary gas turbine exhaust stream to various fuel/air mixtures as they are fed to one or more combustors of a multi-combustor gas turbine engine.

FIG. 3 is a graphical representation (shown generally as 40) comparing the relative amounts of oxygen and carbon monoxide 44 present in an exemplary gas turbine exhaust stream to the various fuel/air mixtures fed to one or more combustors of a gas turbine engine. FIG. 3 plots the fuel-to-air ratio ("F/A" 42) against the concentrations of oxygen and carbon monoxide detected in the combustor exhaust. As the fuel-to-air ratio increases, the oxygen level becomes lower while the CO content increases. In exemplary embodiments, the fuel and air feeds to individual combustor cans will be adjusted one at a time in order to reduce the oxygen content, but not so low that the amount of carbon monoxide exceeds the capability of the downstream catalyst. The amount of oxygen and CO are continuously monitored and controlled using a feedback control loop for the fuel-to-air ratio in order to optimize the oxygen/CO ratio and ensure maximum CO removal efficiency by the downstream catalyst. In theory, the amount of residual CO leaving the catalyst will approach zero at maximum system efficiency.

Figure 4:
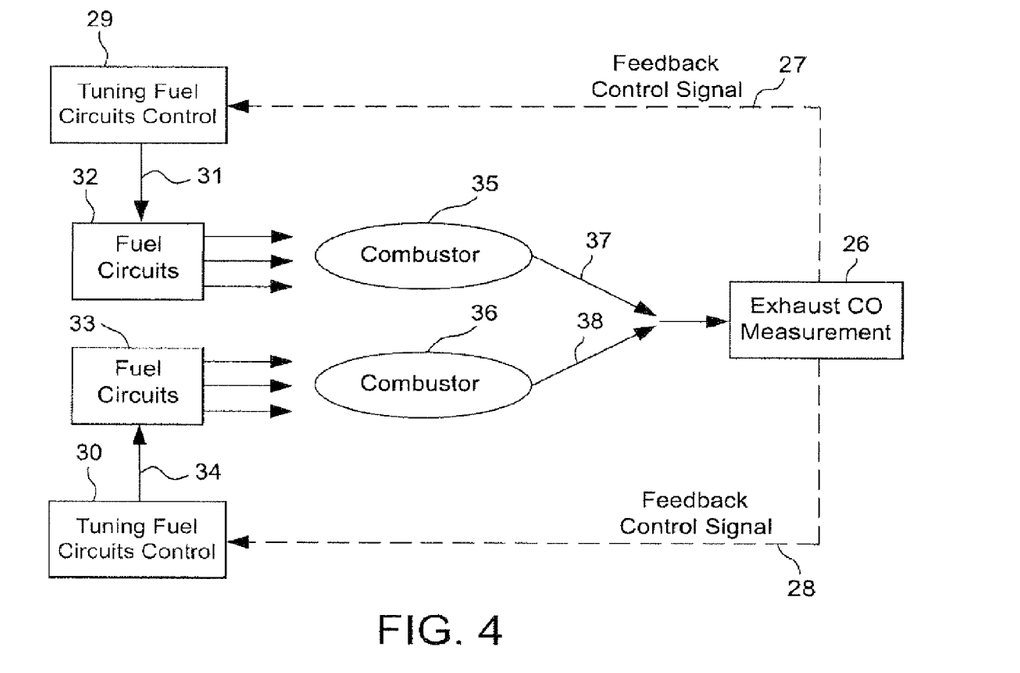
FIG. 4 is a schematic diagram (depicting the major pieces of equipment and control systems) of an exemplary process for controlling the fuel-to-air feed to an individual combustor of a gas turbine engine using stoichiometric recirculation in accordance with a first embodiment of the invention.

FIG. 4 is a schematic diagram (also depicting the major pieces of equipment and control systems) of a process for controlling the feed to a combustor of a gas turbine engine using stoichiometric recirculation and feedback control in accordance with a first embodiment of the invention. As FIG. 4 illustrates, the individual combustors shown as 35 and 36 each have a corresponding exhaust stream 37 and 38 that feeds directly into a carbon monoxide measurement station 26 capable of determining the CO level for each can. The carbon monoxide measurement station 26 generates a plurality of different feedback control signals 27 and 28 that are then transmitted to corresponding tuning fuel circuit controls depicted generally as 29 and 30. The output of the tuning fuel circuit controls 31 and 34 cause incremental minor adjustments to the fuel circuits corresponding to individual combustor cans as shown by way of example at 32 and 33.

Figure 5:
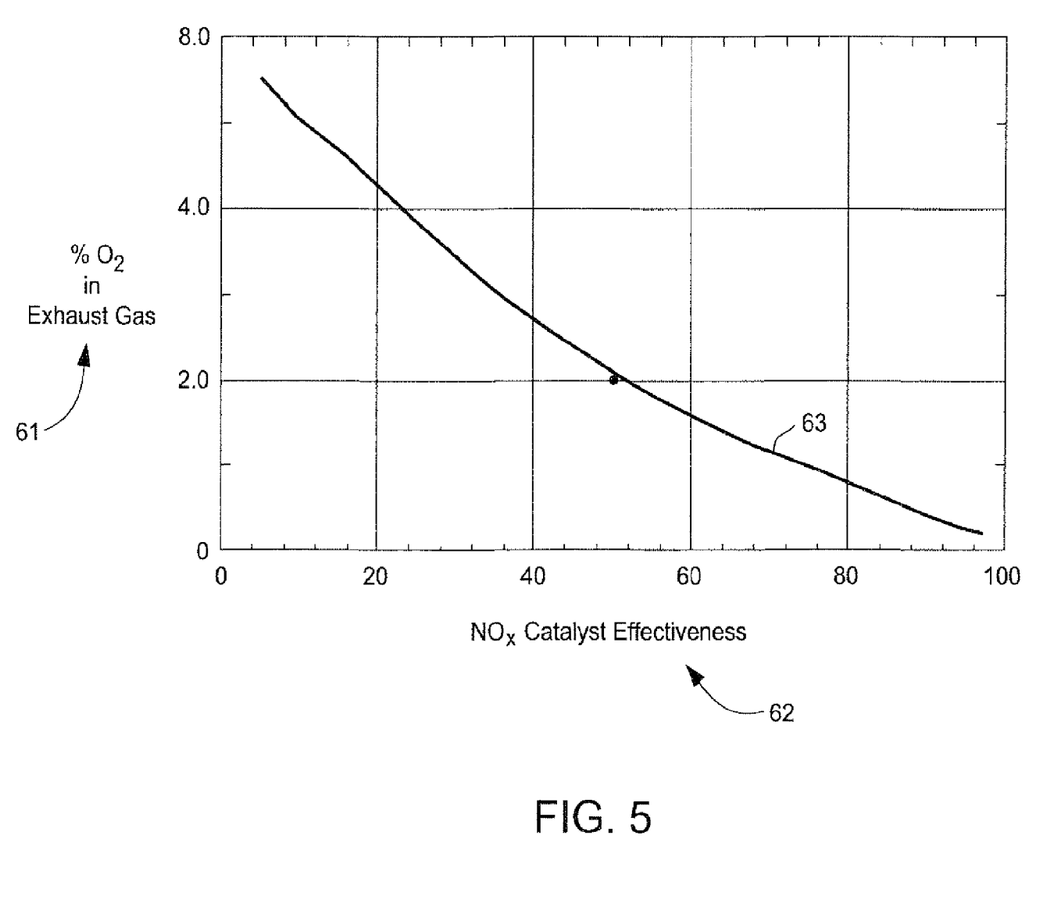
FIG. 5 is a graphical representation of the relative amounts of oxygen present in the exhaust gas stream using stoichiometric controls according to the invention with specific reference to the level of effectiveness of exemplary $NO_x$ catalysts.

FIG. 5 is a graphical representation of the relative amounts of oxygen present in the exhaust gas stream using stoichiometric controls according to the invention when compared to the level of effectiveness of exemplary $NO_x$ catalysts. As in FIG. 4, the invention endeavors to balance the amount of oxygen and carbon monoxide present in the exhaust gasses from the combustors, while at the same time ensuring a high efficiency of the $NO_x$ catalysts used to treat the final exhaust stream. The plot 63 of FIG. 5 shows that the effectiveness of $NO_x$ catalysts (X-axis 62) tends to increase as the amount of oxygen present in the exhaust gases decreases (Y-axis 61).

FIG. 6 is a graphical representation (shown generally as 90) of stoichiometric exhaust gas recirculation emissions under different operating conditions and illustrates the potential benefits of using a tuning fuel circuit and feedback control according to the invention. FIG. 6 compares the amount of oxygen and carbon monoxide remaining in the gas turbine engine exhaust (see left axis, labeled "Emissions $O_2$, CO") to the predicted efficiency resulting from reactions of the carbon monoxide and oxygen in subsequent catalyst treatment system using various candidate exhaust treatment systems, including prior art systems and the present invention (see right axis, labeled "CO/$O_2$, Efficiency").

As noted above, an exemplary system utilizing the feedback control and fine tuning of individual combustors will reduce the amount of unreacted carbon monoxide down while ensuring that a sufficient amount of oxygen remains in the combustor exhaust to stoichiometrically convert all of the CO to carbon dioxide in downstream catalyst operations. Thus, the reference to "Phi" in FIG. 6 indicates the predicted values above and below 2.0 for different CO and oxygen emission levels as compared to corresponding levels of efficiency in removing CO and oxygen from the system. The target Phi value of 1.0 is identified at center axis and would be considered the theoretical "Desired Operation w/o Variation."

For purposes of illustration, the relative position of the tuning valves associated with the feedback control loop according to the invention is designated at line 100, in this case, slightly to the right of Phi=1.0. Having a Phi value slightly greater than 1.0 means that the gas turbine engine would be running somewhat "rich" but with maximum removal of carbon monoxide and oxygen using feedback control. Having too much residual oxygen in the system tends to reduce the effectiveness of the $NO_x$ catalyst, and thus as a practical matter the gas turbine should run in a slightly rich manner with a Phi value to the right of 1.0.

Curve 91 in FIG. 6 represents the ratio of the amount of carbon monoxide and oxygen in the system at points above and below a Phi value of 1.0; curve 92 depicts the amount of carbon monoxide; line 93 represents the oxygen level; curve 94 shows the level of predicted efficiency in removing carbon monoxide from the combustion exhaust; curve 96 reflects an exemplary design target Phi value (shown to the right of 1.0, indicating a slight excess amount of oxygen in order to remove all available CO); vertical line 98 shows the position of Phi for a conventional closed loop emissions control system ("CLEC") without using the tuning valves and feedback control feature of the invention; vertical line 99 reflects the prior art designs using an "open loop" design, again without the advent of tuning valves; and vertical line 97 reflects the relative "efficiency penalty" caused by different amounts of carbon monoxide and oxygen remaining in the exhaust that are not stoichiometrically balanced as described above in connection with the invention. As FIG. 6 illustrates, an ideal design would have a Phi value of 1.0 as indicated. Again, however, as a practical matter, some value slightly above 1.0 will ensure adequate oxygen to remove the lowest predicted amount of CO without adversely affecting the downstream performance of a $NO_x$ removal catalyst.

The "efficiency penalty" 97 identified in FIG. 6 reflects the fact that two CO molecules are necessary for every oxygen molecule in forming carbon dioxide during the catalyst treatment step. The CO data to the right of the vertical line for Phi=1.0 in FIG. 6 indicates the magnitude of the efficiency penalty resulting from the presence of CO still in system following combustion. This residual CO must then be treated using downstream catalyst operations and confirms that a certain amount of excess oxygen is required to consume as much of the exhaust gas CO as possible during catalyst treatment.

In exemplary embodiments, it has been found that the target value for Phi should be approximately 1.025 as shown in the figure and identified as "Design Target Phi." Using a feedback control loop design for individual combustors as described above causes the vertical control line for to move to the left, i.e., back to a value closer to 1.0. In comparison, the operating conditions and Phi values for conventional gas turbine engine systems are shown in FIG. 6 as being far less efficient and labeled "Open Loop Design" which typically relies solely on an exhaust gas temperature reading without any continuing exhaust stream analysis or any feedback control loop based on one or more individual combustor cans. Open loop designs must rely solely on intermittent lab testing of the entire exhaust gas stream before making gross "tuning" changes to the fuel/air ratio.

The "closed loop" system 98 in FIG. 6 also relies to a limited extent on feedback control through limited analysis of the exhaust gases on a continuous basis, but not on a can-by-can basis and without the specific feedback control tuning criteria employed by the invention. In addition, unlike conventional systems, the feedback control loop using the detected amounts of oxygen and CO in the system independently and precisely controls each of the combustors in order to improve the overall performance. That is, very small, incremental changes in fuel flow to each can (on the order of 3% by weight or less) have been found to make a significant difference in overall performance levels as compared to the conventional, 'Open Loop' design. Thus, FIG. 6 shows that opening a tuning valve will move the efficiency penalty line to the right while closing the tuning valve moves the efficiency penalty line to the left (closer to the desired phi value of 1.0).

FIG. 6 also shows how the tuning fuel circuit operates. Opening a tuning valve tends to moves the efficiency penalty line to the right; closing the tuning valve moves the efficiency penalty line to the left, i.e., closer to the desired phi value of 1.0. If the detected value of phi during operation falls below 1.0 the system will be considered "oxygen rich." Thus, during startup operations the gas turbine engine may initially run under "lean" conditions at phi values below 1.0. Thereafter, each tuning valve for each combustor will be adjusted in sequence to increase the amount of fuel, while continuously monitoring the oxygen and CO levels and sending control signals back to the combustor via the feedback control loop. The oxygen level will drop as CO increases and thus each tuning valve is adjusted to achieve a phi value as close to 1.0 as possible. During this process, each combustor is continuously checked and adjusted such that the amount of CO and oxygen in the exhaust approaches maximum efficiency values for the downstream $NO_x$ catalyst.

Figure 7:
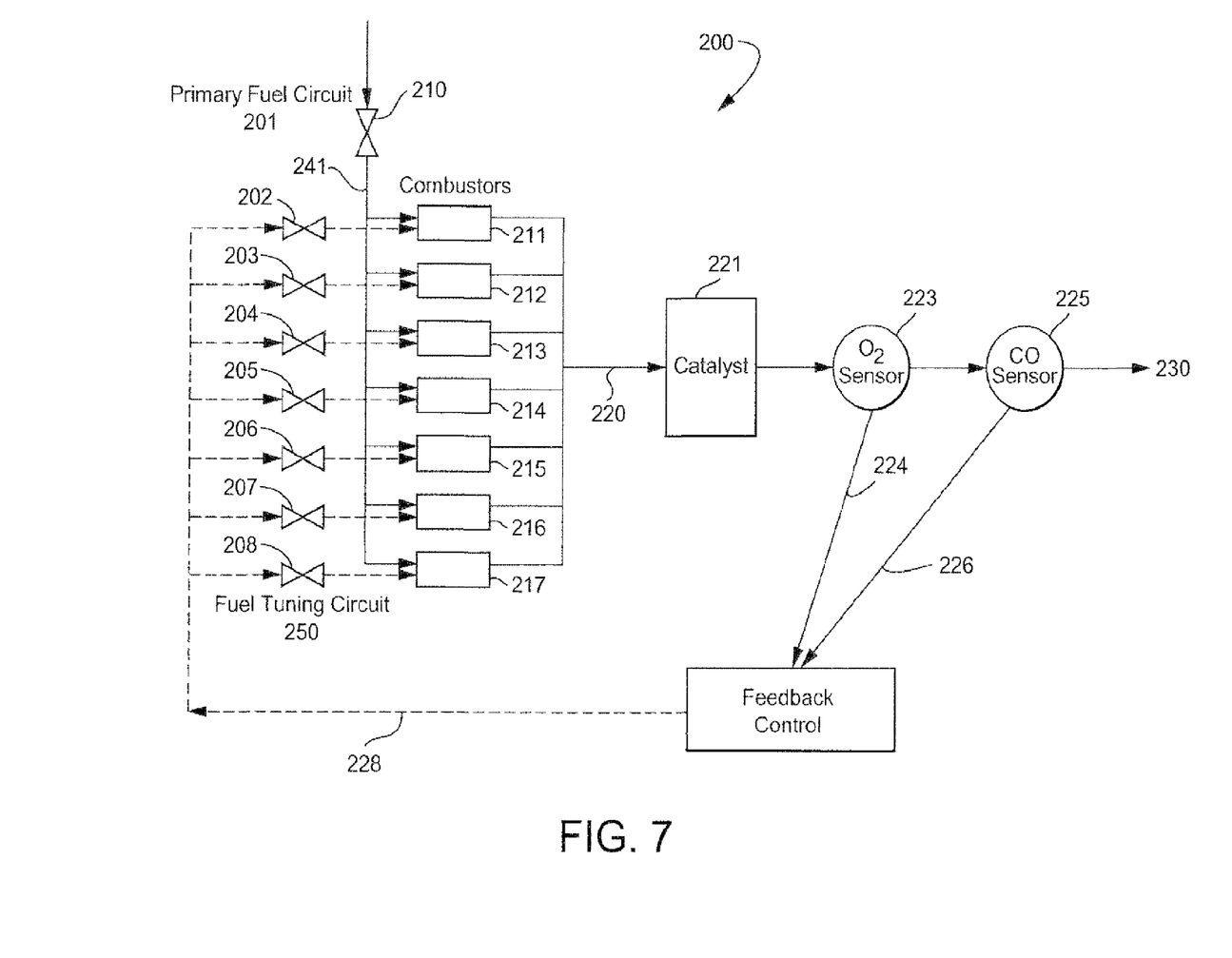
FIG. 7 is a block flow diagram depicting in further detail the principal fuel circuits, tuning fuel circuits and feedback controls for controlling the fuel-to-air ratios of individual combustors in accordance with the invention.

FIG. 7 is another block flow diagram depicting in further detail the principal fuel circuits, tuning fuel circuits and feedback controls for controlling the fuel-to-air ratios of individual combustors in accordance with the invention. The feedback control system 200 includes primary fuel circuit 201 which provides a main fuel feed 240 to the combustor, together with a fuel tuning circuit 250 comprising a plurality of separate control valves identified as 202 through 208 and connected in parallel. As such, the amount of fuel flowing to each of the corresponding combustor cans (identified as 211 through 217 in FIG. 7) can be separately and independently controlled depending on exhaust conditions being detected downstream of the combustor. Typically, as the system is starting up the fuel-to-air ratio for each of the combustors will be separately adjusted in sequence until a steady state condition is achieved with the lowest possible oxygen and CO rate detected downstream. FIG. 7 indicates that the combined exhaust 220 from the bank of combustors passes into the catalyst bed 221 and then through an oxygen sensor 223 and CO sensor 225 which provide data via data line 226 to feedback controller 227, which in turn sends the separate control signals via the fuel tuning circuit to adjust (or not) the amount of fuel being fed to individual combustors. The final exhaust stream from the system, which should be much lower in oxygen and CO, is shown at 230.

While the invention has been described in connection with what presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for analyzing and controlling the composition of an exhaust gas from a gas turbine engine for achieving near-stoichiometric exhaust gas recirculation which reduces $NO_x$ in combustion gases generated in and exhausted by the gas turbine engine, said gas turbine engine comprising a compressor, combustors, and a turbine, said method comprising:
   determining a target residual oxygen level for the combustion gases wherein the target residual oxygen level is selected to promote NOx removal from the combustion gases by a catalyst in a path of the combustion gases and downstream of the turbine;
   after a start-up operation, controlling and feeding fuel and air to each of the combustors, and combusting a mixture of the fuel and air in each of the combustors wherein the combustion occurs at a fuel-rich and near-stoichiometric condition for combustion;
   measuring an oxygen content of said combustion gases, and, if the measured oxygen content differs from the target residual oxygen level, adjusting the fuel and/or air feed to individual ones of the combustors;
   measuring a carbon monoxide content of said combustion gases and, if the measured carbon monoxide content differs from a predetermined carbon monoxide content level, adjusting the fuel and/or air feed to individual ones of the combustors;
   individually adjusting, using a fuel tuning circuit for each of the combustors, the amount of fuel and/or air fed to a particular combustor; and
   recirculating a portion of the combustion gases after being exhausted from the turbine into the compressor;
   wherein adjustments include:
   maintaining the oxygen content at the target residual oxygen level; and
   adjusting the air and/or fuel to achieve the target residual oxygen level and the predetermined carbon monoxide content in the combustion gases.

2. A method according to claim 1 further comprising the step of removing substantially all of said oxygen and carbon monoxide remaining in said exhaust stream prior to said steps of analyzing said oxygen content and said carbon monoxide content.

3. A method according to claim 1, further comprising the step of removing nitrogen oxide compounds from said exhaust gas.

4. A method according to claim 1, wherein said step of feeding a controlled amount of fuel and air to said combustors comprises sending feedback control data in sequence to each one of said combustors to control the amount of fuel being fed to each combustor.

5. A method according to claim 1, wherein said step of feeding a controlled amount of fuel and air to said combustors sequentially adjusts the amount of fuel being fed to selected ones of said combustors based on the detected amount of CO in the exhaust.

6. The method of claim 1, wherein the measuring of the oxygen content of said combustion gases is performed during the start-up operation.

7. The method of claim 1, wherein the measuring of the carbon monoxide content of said combustion gases is performed during the start-up operation.

8. The method of claim 1, wherein the individual adjustment of the amount fuel and/or air being fed to a particular combustor by using a fuel timing circuit is performed during the start-up operation.

9. The method of claim 1, wherein the recirculation of the portion of the combustion gases after being exhausted from the turbine is performed after the start-up operation.

10. A fuel control system for a gas turbine engine, comprising:
   a plurality of combustors;
   a gas compressor;
   a gas turbine for extracting energy from the high velocity exhaust gas from said combustors;
   a generator operatively connected to said gas turbine;
   a primary fuel circuit;
   a fuel tuning circuit for said plurality of combustors, said fuel tuning circuit comprising a plurality of adjustable control valves for achieving near-stoichiometric exhaust gas recirculation for efficient removal of $NO_x$ contaminates in an exhaust stream, wherein each one of said control valves connects to a corresponding one of said plurality of combustors and wherein said fuel tuning circuit operates to control the flow of gaseous fuel from each control valve to a corresponding one of said combustors in a controlled sequence;
   an oxygen sensor in an exhaust stream of said combustors;
   a carbon monoxide sensor in the exhaust stream of said combustors;
   a $NO_x$ contaminate catalyst downstream of said combustors; and
   a feedback control loop operatively connected to said fuel tuning circuit and to said oxygen and carbon monoxide sensors, wherein:
      the feedback control loop is configured to monitor oxygen content and carbon monoxide content in the exhaust stream using the oxygen sensor and the carbon monoxide sensor, respectively, and cause the fuel tuning circuit to individually adjust the fuel and/or air provided to each of the combustors such that the gas turbine engine runs at a level that is fuel rich after a start-up operation and is configured to ensure sufficient oxygen depletion in the exhaust stream for efficient and maximized removal of NOx contaminates by the $NO_x$ contaminate catalyst.

11. A gas turbine engine according to claim 10, further comprising a catalyst bed for removing carbon monoxide from said exhaust gas.

12. A gas turbine engine according to claim 10, further comprising a lower pressure heat recovery steam generator.

13. A gas turbine engine according to claim 10, further comprising a recirculation loop for said exhaust gas back to said gas turbine compressor.

14. A gas turbine engine according to claim 10, further comprising a high pressure heat recovery steam generator.

15. A gas turbine engine according to claim 10, further comprises a primary fuel circuit for said combustors.

16. A fuel control system according to claim 10, wherein said adjustable control valves in said tuning fuel circuit are separately adjusted in sequence to control the flow of gaseous fuel to each one of said combustors and achieve a steady state condition.

17. A fuel control system according to claim 10, wherein each one of said plurality of control valves is independently adjustable to control the flow of fuel to a corresponding one of said plurality of combustors.

18. A fuel control system according to claim 10, further comprising a catalyst for removing oxygen and carbon monoxide from said exhaust stream of said gas turbine.

19. A fuel control system according to claim 10, wherein said oxygen sensor sends data regarding the oxygen content of said exhaust stream to said feedback control loop.

20. A fuel control system according to claim 10, wherein said carbon monoxide sensor sends data regarding the carbon monoxide content of said exhaust stream to said feedback control loop.

* * * * *

UNITED STATES PATENT AND TRADEMARK OFFICE
CERTIFICATE OF CORRECTION

| | | |
|---|---|---|
| PATENT NO. | : 9,074,530 B2 | Page 1 of 1 |
| APPLICATION NO. | : 12/973976 | |
| DATED | : July 7, 2015 | |
| INVENTOR(S) | : Draper | |

It is certified that error appears in the above-identified patent and that said Letters Patent is hereby corrected as shown below:

In The Specification

At column 1, line 57, change "can adversely effect" to --can adversely affect--

At column 6, line 8, change "CC removal" to --CO removal--

At column 7, line 21, change "oxygen" to --oxygen 43--

At column 8, line 7, change "in subsequent catalyst" to --in a subsequent catalyst--

At column 8, line 18, change "above and below 2.0" to --above and below 1.0--

At column 8, line 21, change "center axis" to --center axis 95--

At column 9, line 28, change "`Open Loop` design" to --"Open Loop" design--

At column 10, line 9, change "what presently considered" to --what is presently considered--

Signed and Sealed this
Fifth Day of January, 2016

Michelle K. Lee
*Director of the United States Patent and Trademark Office*